United States Patent

[11] 3,557,891

| [72] | Inventor | John R. Klopfenstein |
| | | Toledo, Ohio |
| [21] | Appl. No. | 759,011 |
| [22] | Filed | Sept. 11, 1968 |
| [45] | Patented | Jan. 26, 1971 |
| [73] | Assignee | The Reliance Electric and Engineering Company |
| | | Toledo, Ohio |
| | | a corporation of Ohio |

[54] ELECTRICAL COUNTING SCALE
6 Claims, 3 Drawing Figs.

[52] U.S. Cl. .................................................. 177/30, 177/200
[51] Int. Cl. ............................................... G01g 19/00
[50] Field of Search .......................................... 177/25, 200, 211, 30

[56] References Cited
UNITED STATES PATENTS

| 1,715,832 | 6/1929 | Hapgood .................. | 177/200X |
| 2,767,974 | 10/1956 | Ballard et al ................ | 177/200 |
| 2,882,035 | 4/1959 | Lauler et al ................ | 177/211X |
| RE24,969 | 4/1961 | Golding ...................... | 177/200 |
| 3,066,752 | 12/1962 | Spademan .................. | 177/211 |
| 3,153,459 | 10/1964 | Smith et al ................. | 177/200UX |
| 3,221,829 | 12/1965 | Kohler ....................... | 177/211X |
| 3,437,160 | 4/1969 | Hill ............................ | 177/211 |
| 3,464,508 | 9/1969 | Engle et al .................. | 177/211X |

*Primary Examiner*—Richard B. Wilkinson
*Assistant Examiner*—George H. Miller, Jr.
*Attorney*—Thomas H. Grafton ABSTRACT: An electrical counting scale comprising a single transducer for both weighing a known number of sample pieces of like weight and an unknown number of said pieces to be counted. Load indicating means electrically connected to the transducer indicates load upon the scale in terms of the number of said pieces to be counted. Calibrating means are provided for so calibrating the load indicating means in accordance with the number of sample pieces and a ratio factor that the single transducer performs both of the foregoing weighing functions.

INVENTOR.
JOHN R. KLOPFENSTEIN

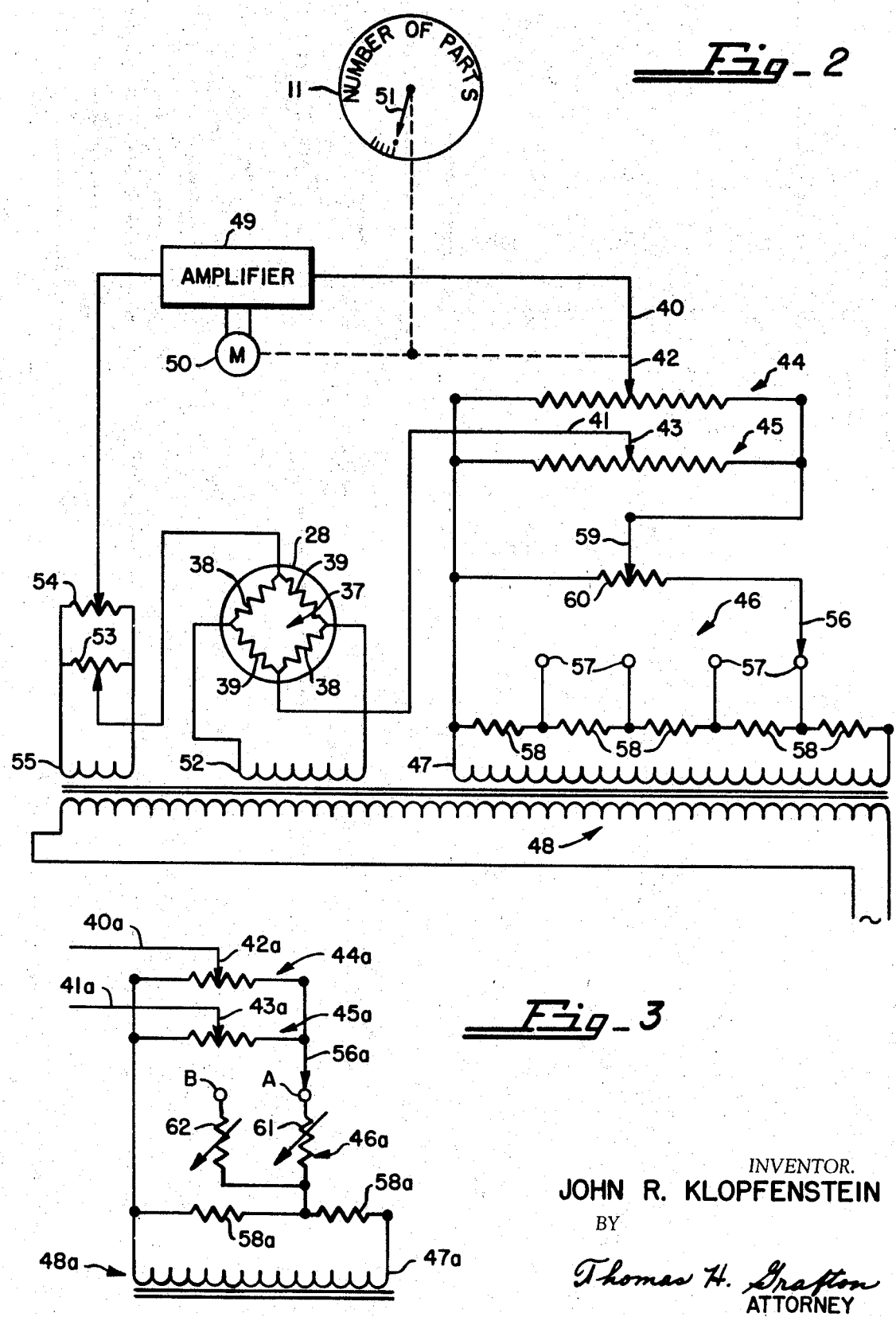

3,557,891

ELECTRICAL COUNTING SCALE

BACKGROUND OF THE INVENTION

1. Field of the Invention

The invention relates to electrical or electronic parts counting weighing scales which weigh unknown numbers of parts each of like weight and indicate the total weight of each load in terms of the number of parts in such load.

2. Description of the Prior Art

U. S. Pat. No. 2,918,270, issued Dec. 22, 1959, in the name of Frank E. Golding discloses an electronic parts counting scale comprising two strain gage load cells, one for weighing a known number of sample pieces of like weight and the other for weighing an unknown number of said pieces to be counted. In operation, the sample pieces remain on the sample load cell.

SUMMARY OF THE INVENTION

Specifically, the invention envisions an electrical counting scale having only one transducer for performing the functions of both of the load cells disclosed in the above U.S. Pat. No. 2,918,270. After an initial adjustment, the sample number of parts are removed from the scale and are not used again as long as parts of like individual weights are being counted.

The objects of this invention are to improve counting scales, to improve techniques in counting parts, and to provide an electrical parts counting scale which uses only one transducer for both sample parts and parts counting weighing.

BRIEF DESCRIPTION OF THE DRAWING

FIG. 2 is a schematic wiring diagram showing the essential components of the counting scale; and FIG. 3 is a schematic wiring diagram showing a modification of a portion of the diagram shown in FIG. 2.

DESCRIPTION OF THE PREFERRED EMBODIMENT

Figure 1:
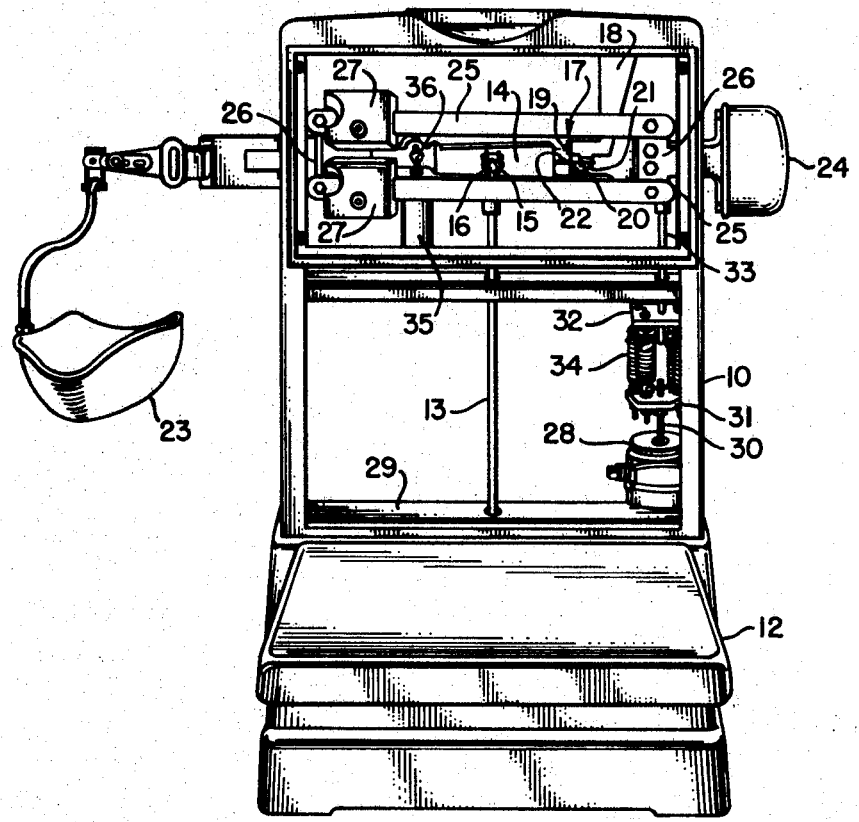
FIG. 1 is a perspective view of an electrical parts counting scale.

The electrical or electronic parts counting scale includes a cabinet 10 surmounted by a dial housing not shown which contains an indicia bearing chart 11 (FIG. 2). A commodity receiver 12 for an unknown number of pieces of like weight to be counted is connected to the lower end of a rod 13 through the usual load supporting levers. The load moment is transmitted to a lever 14 through the rod 13 which is suspended by means of a stirrup 15 from laterally extending pivots 16 in the lever 14. The lever 14 is pivotally mounted by means of crossed fulcrum flexures 17 upon a fulcrum stand 18 fixed inside the cabinet 10. There is a pivot 16 extending from either side of the lever 14, but only one pivot is visible in FIG. 1, and the stirrup 15 is bifurcated to receive the lever between its bifurcation and embrace the pivots, and similarly there is a set of crossed fulcrum flexures 17 not shown which is hidden behind the lever 14. A vertical one of the flexures 17 shown in FIG. 1 is attached at 19 to the fulcrum stand 18 and at 20 to an extension of the lever 14 and a horizontal one of the flexures 17 is attached at 21 to the fulcrum stand 18 and at 22 to the extension of the lever 14. The lever 14 carries a sample pan 23 at one end and a shot box 24 at its other end. Tare beams 25 also are carried by the lever 14, the beams 25 being attached to the lever through brackets 26, one of the brackets 26 also functioning to attach the shot box 24 to the lever 14. Weights 27 are pinned to the beams 25 and are movable as one therewith.

The lever 14 and the weights 24 and 27 are part of a vibration isolation mechanism for electrical weighing scales which is disclosed in detail in U.S. Pat. No. 3,269,472, issued Aug. 30, 1966, in the name of Robert E. Bell. Weights 24 and 27 correspond to weights $W_B$ and $W_A$ shown in the patent and function to reduce the natural vibration frequency of the scale to a relatively low frequency and to adjust the relatively low frequency to the optimum frequency. A strain gage load cell or transducer 28 is supported on a stationary plate 29 and its load receiving extension 30 is connected to a plate 31 which is connected to a second plate 32, carried on the lower end of a rod 33, through four springs 34. The load cell 28 and springs 34 directly correspond in function to the load cell and spring shown in the above U.S. Pat. No. 3,269,472 (load cell 31 and spring 36 in the patent). The rod 33 is pivotally connected to the lever 14 by means of a stirrup and pivots which are not shown; they are like the stirrup 15 and pivots 16. Load in the sample pan 23 or on the commodity receiver 12 causes the load receiving extension 30 to pull upwardly on the load cell 28 placing it under tension. Like the system disclosed in the above U.S. Pat., a dashpot 35 is pivotally connected to the lever 14 at 36. The lever 14 connects the sample pan 23 in a fixed ratio to the commodity receiver 12, i.e., a given weight in the sample pan 23 places a greater force on the load cell 28 than the same weight does when placed on the commodity receiver 12 because of the mechanical advantage provided by the lever 14. For convenience, the fixed ratio is 10 to 1, i.e., a given weight in the sample pan 23 places the same force on the load cell 28 as do 10 of such given weights upon the commodity receiver.

Referring to FIG. 2, the load cell 28 includes a resistance wire strain bridge 37 having resistance elements 38 in two of its legs and resistance elements 39 in the other two legs. The bridge is of an ordinary type used in gages available for measuring strain wherein the elements 38 and 39 are adapted to change in resistance with changes in a condition to be measured, i.e., load applied to the cell 28. Other forms of electrical transducers which produce electrical signals that are functions of the load applied to the load cell 28 can be used. Leads 40 and 41 in circuit with the output terminals of the bridge 37 are connected to sliding contacts 42 and 43 of potentiometers 44 and 45, respectively, connected at their ends and energized from a potentiometer 46 which in turn is energized from a secondary winding 47 of a transformer 48. An amplifier and motor control device is connected in circuit with the lead 40 and controls the operation of an ordinary reversible, two-phase servomotor 50 which both positions an indicator 51 cooperating with the chart 11 and the sliding contact 42. A secondary winding 52 of the transformer 48 energizes the bridge 37. Potentiometers 53 and 54, energized by a secondary winding 55 of the transformer 48, are between one of the output terminals of the load cell 28 and the amplifier 49 and function to set the indicator 51 to zero in an initial adjustment to compensate for dead load of the mechanical parts, such as are shown in FIG. 1, on the load cell 28. Potentiometer 53 produces a fine adjustment and potentiometer 54 produces a coarse adjustment.

The bridge 37 forms a balanceable network that is adapted to be unbalanced in response to changes in load applied to the load cell 28, i.e., the network develops an output voltage which is a function of load applied to the load cell. The output voltage opposes a balancing voltage, i.e., opposite in phase, from the potentiometer 44, the potentiometer 44 driven by the servomotor 50 serving as a continuously automatically adjustable voltage source. The output voltage of the load cell opposes the balancing voltage of the potentiometer 44 to determine the flow of current through the amplifier 49. An unbalance of the voltages results in operation of the servomotor 50 to turn the indicator 51 through a distance proportional to load placed upon the load cell 28 and move contact 42 until the opposing voltages are equal, whereby input voltage to the amplifier 49 is restored to null. The positions of the contact 42 are representative of the loads measured, and these positions can be changed by manual adjustment of the contact 43 resulting in an indication of the values from a different zero point. Although the indicator 51 is turned through a distance proportional to load placed upon the load cell 28, the chart 11 is calibrated to read in number of pieces or parts.

The potentiometer 46 and the secondary 47 serve as an energizing means for adjustably energizing the potentiometers 44 and 45, slider 56 and terminals 57 and their associated resistors 58 serving as stepwise coarse adjustment means and slider 59 and its associated resistor 60 serving as infinitely fine adjustment means. The potentiometer 46 serves as a span adjustment to vary the travel of the indicator 51 for given load upon the load cell 28. The slider 42 is stopped in accordance with the given load at a voltage balancing position and by varying the energizing voltage to the potentiometer 44 such voltage balancing position is varied to in turn vary the readout position of the indicator 11.

In operation, the zero potentiometer slider 43 is so adjusted by trial and error, when there is no load either in the sample pan 23 or upon the commodity receiver 12, that a change in the position of the potentiometer sliders 56 and 59 do not change the zero indication of the indicator 51. A known number of pieces, i.e., the sample, is placed in the sample pan 23. The number can be chosen by statistical methods or by trial and error, i.e., it is any small convenient number which is known to produce good results. A typical number for a scale used in counting nuts or bolts is five. As described above, the particular convenient fixed lever ratio is 10 to 1. The potentiometer 46 is a calibrating means for calibrating the load indicating means in accordance with the number of sample pieces multiplied by the predetermined ratio factor, whereby the load indicating means indicates zero when said sample pieces are removed from the scale and thereafter indicates load upon the scale in terms of the number of said pieces to be counted. The calibrating means 46 is an infinitely adjustable voltage generator. The potentiometer 46 is adjusted to set the indicator 51 to a parts indicating position of the chart 11 to the fixed ratio of 10 times 5, the number of sample parts, i.e., to indicate 50. In other words, the five sample pieces in the pan 23 cause the indicator 51 to point to the same place on the chart 11 where the indicator 51 would point if the sample pieces were removed from the pan 23 and 50 like parts were placed upon the commodity receiver 12. The sample pieces then are removed from the pan 23 and the indicator 51 indicates zero. After this initial calibrating adjustment, unknown numbers of pieces of like weight are placed on the commodity receiver 12 whereupon the indicator 51 points to the number of parts upon the commodity receiver 12. When different parts are to be counted, another calibrating adjustment is made using a new sample.

One of the features resides in the use of same load cell 28 for weighing both the unknown number of pieces and the known sample number of pieces. Another feature resides in removing the sample pieces from the pan 23 after the initial adjustment is made and not using them again as long as like parts are counted.

Since the sample pieces are removed from the pan 23 and not used again as long as like parts are being counted, the span adjustment potentiometer 46 can be calibrated so that its position for various samples can be remembered. In FIG. 3, the span potentiometer 46 is shown as potentiometer 46a. Similarly numbered parts in FIGS. 2 and 3 refer to like parts.

The circuit shown in FIG. 3 is used in scales for counting coins. Two of the foregoing initial adjustments are made by means of the span adjustment potentiometer 46a using dimes and quarters as the two respective samples. Calibrated positions A and B (predetermined voltage supplying positions) on the potentiometer 46a are the dimes and quarters positions, respectively. In this case, the chart 11 is calibrated in parts as indicated in FIG. 2 with additional calibrations reading dollars and cents. Additional span adjustments are made from time to time to check the accuracy of the calibrated positions of the potentiometer 46a. For example, silver quarters weigh more than the sandwich type requiring a recalibration in this instance. However, an understanding of the present invention only requires an understanding that, after the two calibrated positions of the potentiometer 46a are known, to count dimes, for example, the slider of the potentiometer 46a is set at A, whereupon the indicator points to the number of dimes placed upon the commodity receiver 12.

Potentiometer 46 (FIG. 2) for general counting and potentiometer 46a (FIG. 3) for coin counting are somewhat different in structure because of the high accuracy required in weighing coins. Dimes and quarters have a closely similar value per pound. Hence, resistor 58a is used in both the A and B positions of the slider 56a and fine adjustable resistors 61 and 62 are used to calibrate the indicator 51 to the exact dime and quarter count indicating positions. Additional resistors 58a and fine adjustment resistors 61 and 62 can be added to count 50-cent pieces, etc.

It is to be understood that the above description is illustrative of this invention and that various modifications thereof can be utilized without departing from its spirit and scope.

I claim:

1. An electrical counting scale comprising, in combination, a commodity receiver for an unknown number of pieces of like weight to be counted, a sample pan for a known number of said pieces, lever means connecting the pan in a fixed ratio to the commodity receiver, transducer means connected to the lever means, load indicating means electrically connected to the transducer means, and electrical calibrating means in circuit between the transducer means and the load indicating means and including span adjustment means for setting the load indicating means in an initial adjustment to said fixed ratio multiplied by the number of said pieces in the sample pan and further including zero adjustment means for maintaining the load indicating means at zero when the span adjustment means is varied with no load upon the scale, whereby the load indicating means indicates zero when said pieces are removed from the pan and when there is no load upon the commodity receiver and thereafter indicates load upon the commodity receiver in terms of the number of said pieces to be counted.

2. An electrical counting scale according to claim 1 wherein the span adjustment means includes an infinitely adjustable voltage generator.

3. An electrical counting scale according to claim 1 wherein the span adjustment means includes an adjustable voltage generator comprising adjustable means movable to predetermined voltage supplying positions corresponding to several types of pieces to be counted.

4. An electrical counting scale according to claim 1 wherein the span adjustment means includes an adjustable voltage source comprising adjustable means movable stepwise to voltage supplying positions providing a coarse adjustment and infinitely adjustable means movable to voltage supplying positions providing a fine adjustment.

5. An electrical counting scale comprising, in combination, a commodity receiver for an unknown number of pieces of like weight to be counted, a sample pan for a known number of said pieces, lever means connecting the pan in a fixed ratio to the commodity receiver, transducer means connected to the lever means having an output voltage which is a function of load upon the scale, an adjustable voltage source that supplies a balancing voltage in opposition to the output voltage, load indicating means for indicating the balancing voltage in terms of the number of said unknown number of pieces, servo means for automatically adjusting the voltage source and the load indicating means in a balancing direction in response to differences between the voltages, energizing means for adjustably energizing the voltage source for setting the load indicating means in an initial adjustment to said fixed ratio times the number of said pieces in the sample pan and a zero potentiometer in circuit with the transducer means and with the voltage source and which is energized by said energizing means and which is settable when no load is upon the scale to a position wherein a change in the energizing means produces no change in indication provided by the load indicating means, whereby the load indicating means indicates zero when said pieces are removed from the pan and when there is no load upon the commodity receiver and thereafter indicates load upon the commodity receiver in terms of the number of said pieces to be counted.

6. An electrical counting scale according to claim 5 wherein the energizing means includes an adjustable voltage generator comprising adjustable means movable to predetermined voltage supplying positions corresponding to several types of pieces to be counted.